(12) United States Patent
Tsao et al.

(10) Patent No.: US 10,762,756 B2
(45) Date of Patent: Sep. 1, 2020

(54) MULTI-DIRECTION MULTI-RANGE GATE MICROWAVE INTRUSION DETECTION DEVICE AND METHOD THEREOF

(71) Applicant: U&U ENGINEERING INC., Taipei (TW)

(72) Inventors: Ping-Chang Tsao, Taipei (TW); Hung-Chun Lin, Taipei (TW); Chang-Ming Yang, Taipei (TW); Yi-Hsuan Tan, Taipei (TW); Shuo-Kai Liu, Taipei (TW)

(73) Assignee: U&U ENGINEERING INC., Taipei (TW)

( * ) Notice: Subject to any disclaimer, the term of this patent is extended or adjusted under 35 U.S.C. 154(b) by 0 days.

(21) Appl. No.: 16/362,657

(22) Filed: Mar. 24, 2019

(65) Prior Publication Data

US 2019/0295394 A1   Sep. 26, 2019

(30) Foreign Application Priority Data

Mar. 26, 2018 (TW) .............................. 107110331 A (51) Int. Cl.
*G08B 13/24* (2006.01)
*G08B 25/00* (2006.01)

(52) U.S. Cl.
CPC ............ *G08B 13/24* (2013.01); *G08B 25/00* (2013.01)

(58) Field of Classification Search
None
See application file for complete search history.

(56) References Cited

U.S. PATENT DOCUMENTS

| | | | | |
|---|---|---|---|---|
| 2005/0024208 A1* | 2/2005 | Maki | .................. | G08B 13/2497 340/545.3 |
| 2005/0231353 A1* | 10/2005 | DiPoala | ............... | G08B 29/183 340/522 |
| 2009/0079563 A1* | 3/2009 | Tsuji | ...................... | G01V 8/005 340/552 |
| 2011/0006897 A1* | 1/2011 | Micko | .................. | G08B 13/191 340/565 |
| 2015/0170505 A1* | 6/2015 | Frew | ..................... | B60R 25/305 340/539.22 |

* cited by examiner

*Primary Examiner* — John F Mortell
(74) *Attorney, Agent, or Firm* — Mark M. Friedman (57) ABSTRACT

The present disclosure provides microwave intrusion detecting device with multi-direction and multi-range fence which detects human or vehicle intrusions within altering range by transmitting microwave signals and receiving echo signals. It includes pair of detecting units, a signal unit, a processor, a control interface, an alarm unit, a storage unit, a communication unit, and a power supply unit. The pair of detection units are physically composed back-to-back which can form a long-distance electronic fence. The second detection unit can be separated from a main body to adjust the antenna coverage angle to adapt to environment or obstacles. The signal unit generates the frequency modulated continuous wave signal to the two detecting units respectively. The processor can set thresholds segments to from passing gates in microwave intrusion detecting device and can generate an alarm unit message.

10 Claims, 12 Drawing Sheets

MULTI-DIRECTION MULTI-RANGE GATE MICROWAVE INTRUSION DETECTION DEVICE AND METHOD THEREOF

FIELD OF INVENTION

The present disclosure relates to a microwave intrusion detecting device and method, in particular to a microwave intrusion detecting device and method capable of adjusting an antenna angle and threshold of segments.

BACKGROUND OF INVENTION

Figure 1:
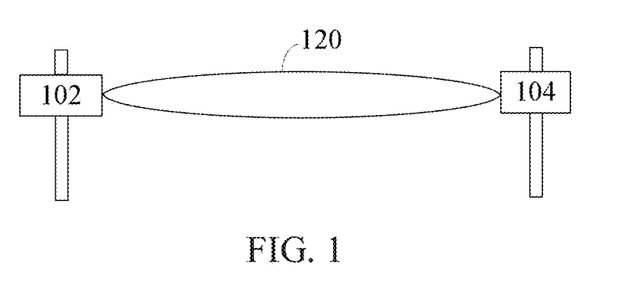
FIG. 1 illustrates a bistatic electronic fence of present technology.
Figure 2:
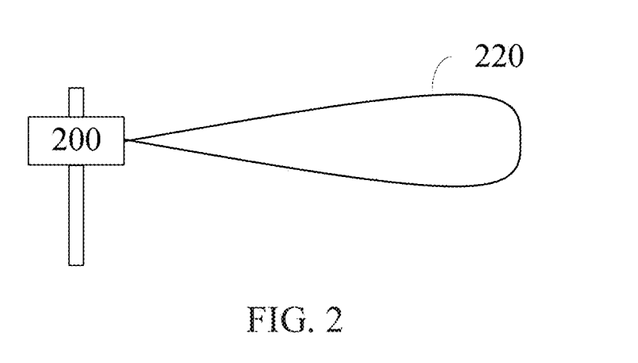
FIG. 2 illustrates a monostatic electronic fence of present technology.

A microwave intrusion detecting device, which is a so-called electronic fence, is used to detect whether an area is intruded by an object. Detection utilizes emitting electromagnetic waves and compares energy of transmitted electromagnetic waves with energy of received electromagnetic waves to determine whether an intrusion occurs. There are two main types of detection method. One detection method is an on-beam type electronic fence, which is a so-called bistatic electronic fence as shown in FIG. 1, where a transmission end 102 and a receiving end 104 of the electronic fence are installed in different locations. The detection area 120 is between the transmitting device and the receiving device. The energy detected by the receiving end from the transmitting end will decrease when objects intrude into the detection area 120 thus intrusion is determined. Another detection method is a radar-type electronic fence which is a so-called monostatic electronic fence as shown in FIG. 2. The transmitting end and the receiving end of this type of electronic fence are located in the same device 200. The measurement area 220 is determined by the angle of the antenna and the energy intensity of the emitted electromagnetic wave. When an object intrudes into detection area 220, the electromagnetic wave is reflected back to the detecting device 200, so that the electromagnetic wave energy detected by the receiving end will rise thus intrusion can be determined.

The bistatic electronic fences require being equipped with pair of transmitting devices and receiving devices at two different locations, thus installation cost is higher and the maintenance requires more effort. Additionally, the detection area is limited only between the transmitting device and the receiving device, and the transmitting device and the receiving device need to be aligned. In contrast, the monostatic electronic fences require being equipped with only one detection device. However, the detection area of the monostatic electronic fence is short. These two kinds of electronic fences are easily affected by environment or interfered by unintended signal reflections. In addition, in some cases, objects pass through certain parts of the electronic fence often, such as parking entrances or personnel sidewalk, thus false alarm occurs. The present solution is equipping passing objects or personnel with radio frequency identification chip. However, additional identification devices and identification chips are needed which results increase of the cost.

Therefore, a detecting device that combines a transmitting end and a receiving end is required in the purpose of reducing the installation cost. In the meanwhile, the detecting device itself can overcome environmental interference to reduce the probability of false detection.

SUMMARY OF INVENTION

The present disclosure provides a microwave intrusion detecting device with multi-direction and multi-range fence includes a first detecting unit, a second detecting unit, and a processor. The first detecting unit is utilized to detect a first area and generate a first detecting result. The first area includes a first segment and a second segment. The first detecting unit includes a first emitting end and a first receiving end. The first emitting end is utilized to emitting first microwaves. The first receiving end is utilized to receive reflected first microwaves. The first detecting unit obtains the first detecting result according to the reflected first microwaves. The first detecting result includes an energy of the reflected first microwaves and a reflected distance of the reflected first microwaves. The second detecting unit is utilized to detect a second area and generate a second detecting result. The second area includes a third segment and a fourth segment. The second detecting unit includes a second emitting end and a second receiving end. The second emitting end is utilized to emitting second microwaves. The second receiving end is utilized to receive reflected second microwaves. The second detecting unit generates the second detecting result according to the reflected second microwaves. The second detecting result includes an energy of the reflected second microwaves and a reflected distance of the reflected second microwaves. The processor is utilized to receive the first detecting result and the second detecting result and set a first threshold, a second threshold, a third threshold, and a fourth threshold respectively corresponding to the first segment, the second segment, the third segment, and the fourth segment. An alarm unit is utilized to generate a warning message if the reflected distance of the reflected first microwaves falls in the first segment and the energy of the reflected first microwaves exceeds the first threshold, or if the reflected distance of the reflected first microwaves falls in the second segment and the energy of the reflected first microwaves exceed the second threshold, or if the reflected distance of the reflected second microwaves falls in the third segment and the energy of the reflected second microwaves exceed the third threshold, or if the reflected distance of the reflected second microwaves falls in the fourth segment and the energy of the reflected second microwaves exceed the fourth threshold. The warning message includes a location of the first segment, the second segment, the third segment, or the fourth segment.

The present disclosure further provides a microwave intrusion detecting method with multi-direction and multi-range fence includes emitting first microwaves and receiving reflected first microwaves by a first detecting unit; calculating an energy of the reflected first microwaves and a reflected distance of the reflected first microwaves to obtain a first detecting result of the first segment and a second segment; emitting second microwaves and receiving reflected second microwaves by a second detecting unit; calculating an energy of the reflected second microwaves and a reflected distance of the reflected second microwaves to obtain a second detecting result of the third segment and a fourth segment; generating a warning message if the reflected distance of the reflected first microwaves falls in the first segment and the energy of the reflected first microwaves exceeds the first threshold, or if the reflected distance of the reflected first microwaves falls in the second segment and the energy of the reflected first microwaves exceed the second threshold, or if the reflected distance of the reflected second microwaves falls in the third segment and the energy of the reflected second microwaves exceed the third threshold, or if the reflected distance of the reflected second microwaves falls in the fourth segment and the energy of the reflected second microwaves exceed the fourth threshold.

The warning message includes a location of the first segment, the second segment, the third segment, or the fourth segment.

Comparing with the existing technologies, the present disclosure can save hardware and installation cost by integrating pair of detecting units on the same device. Longer detecting distance is covered and the covered angle is adjustable. Meanwhile, by adjusting the trigger threshold of each segments of detecting area, passing gates can be set for freely entering and exiting. The microwave intrusion detecting device with multi-direction and multi-range fence of the present disclosure can be applied to various detecting environment. The possibility of false detection is reduced thus the reliability of detection is enhanced. The warning message contains the location of the segment, so that the location of the alarm can be known immediately. The monitoring system can be combined and monitored. The display zooms in on the area where the alarm is issued. When there is a situation, a staff can be quickly sent to deal with.

DETAILED DESCRIPTION OF PREFERRED EMBODIMENTS

Embodiments of the present disclosure will be described in detail below with reference to the accompanying drawings to clarify the above-mentioned purpose, features, and advantages of the present disclosure. The upper, lower, top, bottom, left, right, front, rear, lateral, around, central, horizontal, vertical, longitudinal, latitudinal, radial, and aspects of the detailed description are merely for convenience of describing the relative relationship between the components rather than limitations of the embodiments of the present disclosure. It is obvious that the described embodiments are only a part, not all, of the embodiments of the invention. All other embodiments obtained by a person of ordinary skill in the art based on the embodiments of the present disclosure without creative efforts are within the scope of the present disclosure.

Figure 3:
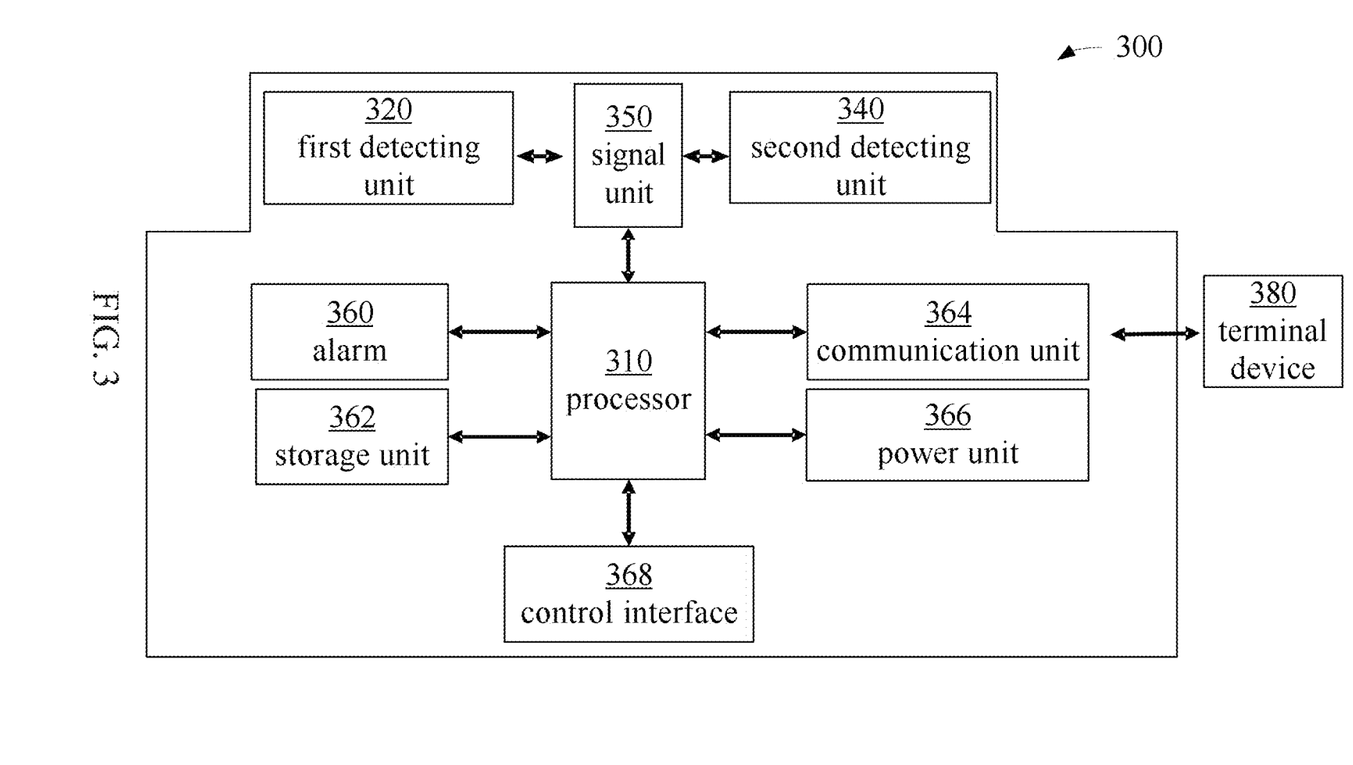
FIG. 3 illustrates a first embodiment of a microwave intrusion detecting device with multi-direction and multi-range fence of the present disclosure.

Please refer to FIG. 3, which illustrates a block diagram of a microwave intrusion detecting device with multi-direction and multi-range fence of the present disclosure. Intrusion detecting device 300 includes a processor 310, a first detecting unit 320, a second detecting unit 340, a signal unit 350, alarm unit 360, a storage unit 362, a communication unit 364, a power supply unit 366, a control interface 368, and a terminal device 380. The first detecting unit 320 and the second detecting unit 340 utilize microwaves for detection. The signal unit 350 provides frequency modulated continuous waves (FMCW) to the first detecting unit 320 and the second detecting unit 340. The first detecting unit 320 and the second detecting unit 340 amplify and emit the FMCWs and receive reflected signals. The signal unit 350 transfers signals (i.e. frequency differences) to detecting results according to signals received by the first detecting unit 320 and the second detecting unit 340. The signal unit 350 transmits the detecting results to the processor 310. The processor 310 determines whether detecting areas are intruded or not according to the received detecting results and predetermined thresholds. If intrusion is detected, the processor 310 can make the alarm unit 360 generate sounds, flash, or other warning message and can transmit detecting results to the terminal device 380 through the communication unit 364 so that related user can be informed there is an intrusion happening. The storage unit 362 storages detecting results from the single unit 350, signals transmitted to the alarm unit 360, or signals transmitted to the communication unit 364 thus working data of the intrusion detecting device 300 can be examined while needed. The communication unit 364 provides communication service by utilizing wire communication protocols, such as Ethernet, RS485, RS232, or wireless communication protocols, such as wireless local area network (WLAN), WIFI, BLUETOOTH. The power supply unit 366 can be a direct current power source, a direct current power transfer from main electricity which is altering current by a rectifier, or a battery to supply required power to the intrusion detecting device 300.

Figure 4:
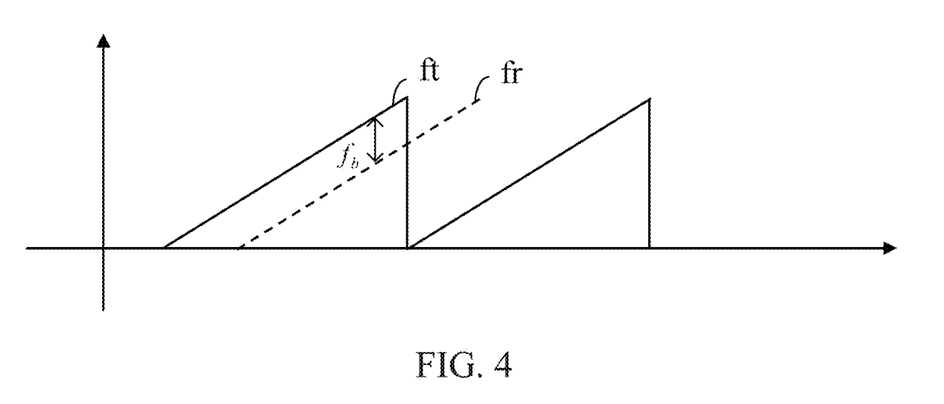
FIG. 4 illustrates a frequency modulated continuous wave utilized in the present disclosure.

Please refer to FIG. 4 which illustrates the FMCW utilized by the present disclosure. The intrusion detecting device 300 obtain distance parameters of intruding objects (may be human, vehicle, animals, etc.) by utilizing FMCW technologies. The intrusion detecting device 300 estimates a distance R of the target object according to frequency difference ($f_b$)

by mixing a frequency of transmitted signal ft and a frequency of reflected signal fr. Formulas are as shown in formula (1) and formula (2).

$$f_b = \frac{2RB}{cT} \quad (1)$$

$$R = \frac{f_b cT}{2B} \quad (2)$$

Parameter $f_b$ represents frequency difference between transmitted signal and reflected signal. Parameter R represents distance between the intruding object and radar. Parameter B represents a scanning bandwidth of the FMCW. Parameter T represents a scanning duration of the FMCW. Parameter c represents the speed of light.

Figure 5:
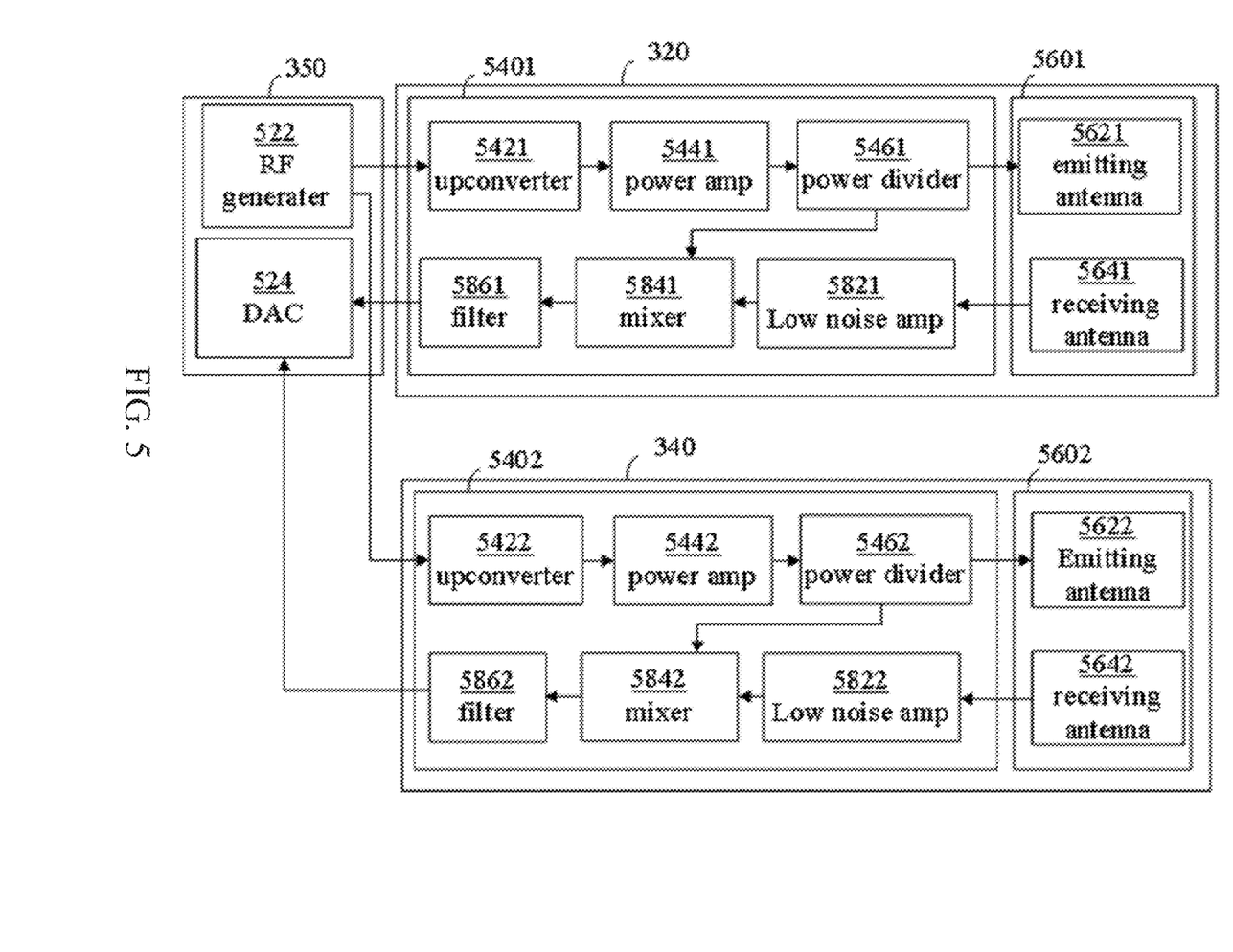
FIG. 5 illustrates a block diagram of a signal unit and detecting unit of the present disclosure.

FIG. 5 illustrate detail block diagram of the first detecting unit 320, the second detecting unit 340, and the signal unit 350 of the present disclosure. The first detecting unit 320 includes a first transmit-receive unit 5401 and a first antenna unit 5601. The second detecting unit includes a second transmit-receive unit 5402 and a second antenna unit 5602. The first transmit-receive unit 5401 includes an upconverter 5421, a power amplifier 5441, a power divider 5461, a low noise amplifier 5821, a frequency mixer 5841, and a filter 5861. The second transmit-receive unit 5402 includes an upconverter 5422, a power amplifier 5442, a power divider 5462, a low noise amplifier 5822, a frequency mixer 5842, and a filter 5862. A radio frequency (RF) generator 522 of the signal unit 350 provides FMCWs to the first detecting unit 320 and the second detecting unit 340. The signal unit 350 receives echo signals from the first detecting unit 320 and the second detecting unit 340. Because structures and functions of the second detecting unit 340 are the same as the first detecting unit 320. Therefore, the followings will take the first detecting unit 320 as an example. Please take the first detecting unit 320 as the example of the structures and functions of the second detecting unit 340. The structures and functions of the second detecting unit 340 are not repeatedly illustrated. After the RF generator 522 of signal unit 350 generates a FMCW, the FMCW is transmitted to the emitting antenna 5621 of the first antenna unit 5601 through the upconverter 5421, the power amplifier 5441, and the power divider 5461 of the first detecting unit 320 in sequence. The receiving antenna 5641 of the first antenna unit 5601 transmits the received signals to an analog-to-digital converter (ADC) 524 of the signal unit 350 through the low noise amplifier 5821, frequency mixer 5841, and the filter 5861 of the first transmit-receive unit 5401. The frequency mixer 5841 mixes the echo signals (reflected signals) and the transmitted signal, then the filter 5861 obtains a frequency difference $f_b$ by filtering harmonics out. The frequency difference $f_b$ is transmitted to the ADC of the signal unit 350. The FMCW of the present disclosure can be triangle wave or sawtooth wave. The frequency difference and distance are in direct proportion. After convert the frequency difference $f_b$ to digital data, the processor 310 transfers the digitalized frequency difference $f_b$ to spectrum by utilizing fast Fourier transform and obtains the distance R between the intrusion detecting device and the intruding object by utilizing the above-mentioned formula (2).

The first embodiment of the present disclosure has an operating frequency 24 GHz and a transmission power 17 dBm. However, this is only an example and is not intended to limit the present disclosure. The operating frequency and the transmitting power may be different according to the environment, the demand, and the power of the device. The environment, the demand, and the power of the device are adjusted, and the operating frequency and the transmitting power that can achieve the detection function are all within the scope of the present disclosure.

In the first embodiment of the present disclosure, the intrusion detecting device 300 includes the first detecting unit 320 and the second detecting unit 340 (as shown in FIG. 3). Please refer to FIG. 6 together, where the first detecting unit 320 includes a first antenna unit 620 and a first transmit-receive unit 622, the second detecting unit 340 includes a second antenna unit 640 and a second transmit-receive unit 642. The two detecting units only need to use one signal unit 350 to process the detection result. The intrusion detecting device 300 of the present disclosure can be integrated into the intrusion detecting device 300 as shown in FIG. 7. The mounting rod 720 passes through a groove on the intrusion detecting device 300 for fixing the intrusion detecting device 300. The first antenna unit 620 and the second antenna unit 640 are laterally disposed on sides of the intrusion detecting device 300.

Figure 8:
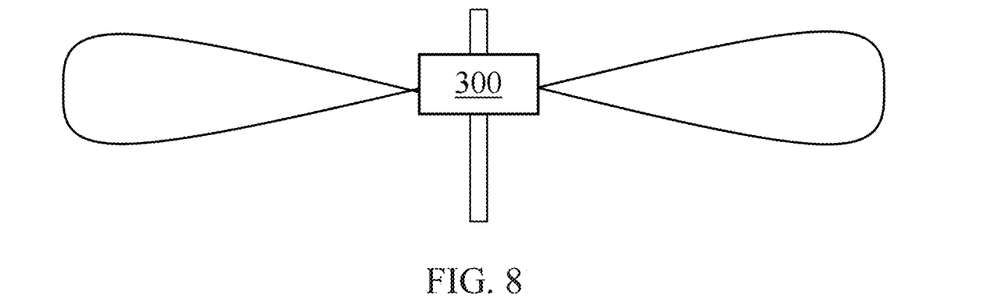
FIG. 8 illustrates a top view of an antenna radiation pattern of the first embodiment.

Please refer to FIG. 8 which shows the antenna radiation pattern of the first embodiment. The first antenna unit 620 and the second antenna unit 640 of the first embodiment are in a back-to-back configuration for forming electronic fences over long distances by performing double receiving and double transmitting manner. For example, the device measures about 213×253×124 mm and weighs about 2.5 kg. The antenna covers an angle of 5 degrees horizontally and 10 degrees vertically. The installation height of the device is about 150 cm. In this way, taking the unilateral detecting distance is 150 meters as an example, the detection area of the intrusion detecting device 300 of the present invention can reach 300 meters, and the two detection units are integrated into a single device, so the first embodiment has both simplified hardware and simplified detecting results transmission.

In general, after the electronic fence is activated, person or vehicle will not be able to touch or cross the fence. If the person or vehicle has to cross the fence, the electronic fence device needs to be disabled which cause inconvenience in practice. Therefore, the present disclosure can also divide the detection area into a plurality of consecutive segments (multi-range fence). The control interface 368 can set some of the plurality of segments (multi-range fence) disable. The effect is equivalent to the setting to "passing gates" with free access, while the remaining segments are enabled. After the fence function is activated, person or vehicles are free to enter and exit without triggering an intrusion event within the multi-range fences which are set in disable status.

Figure 9:
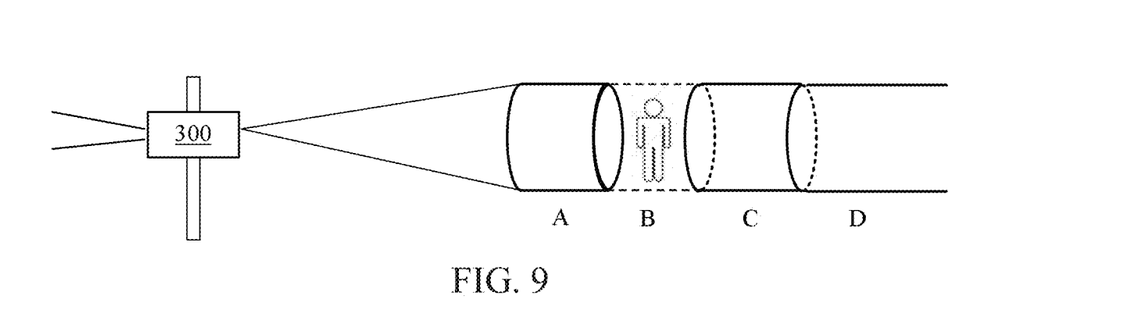
FIG. 9 illustrates passing gates of the first embodiment of the present disclosure.
Figure 10:
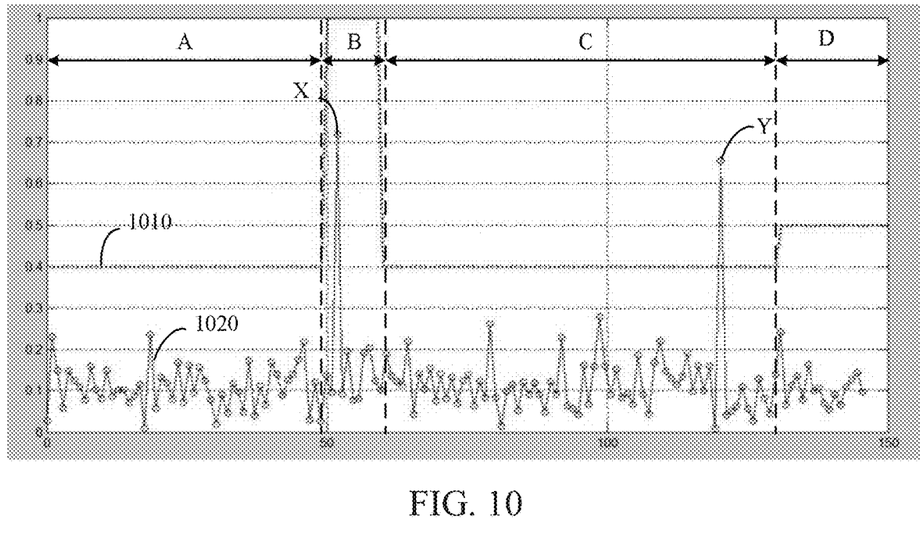
FIG. 10 illustrates trigger thresholds of the first embodiment of the present disclosure.

As shown in FIG. 9, the detection area of the intrusion detecting device 300 can be divided into several segments, taking four segments A, B, C, and D as an example. In the segment B, crossing may happen often because of the environment. If a person enters or exits or a car passing by, a general detecting device will issue a warning as soon as an object passes which disturbs the monitor. Therefore, in the first embodiment of the present disclosure, different threshold values can be set for different segments to achieve the effect of "gates". Please correspondingly refer to FIG. 10 which is a schematic diagram of the detecting trigger threshold. The horizontal axis is the distance and the vertical axis is the signal strength, of which line 1010 is the trigger threshold. For example, the B segment in FIG. 9 is a gate for a person to enter and exit, and the trigger threshold can be set as shown in the B segment corresponding to FIG. 10, and the trigger value is set higher than other segments, or set the value that is almost impossible to trigger. Therefore, even point X of the digital signal 1020 in FIG. 10 is higher than the point Y, the point X does not trigger an alarm unit. In contrast, the point Y triggers an alarm unit and makes processor 310 send a warning message to alarm unit 360. In addition, each multi-range fence can be set in an independent trigger threshold value. That is, each segment can have different sensitivity to respond to the different impact under difference sections of the electromagnetic environment (such as noise, clutter and interference). As shown in FIG. 10, for example, the distance of segment B is between 50 to 59 meters and is set as the pass gate, so the trigger threshold is set as 1, which is equivalent to disabling the detection function. The segment D, which is between 130 to 149 meters, has strong background reflection thus the trigger threshold of the segment D is set higher than segment A and segment C. The detection range of the intrusion detecting device 300 in this embodiment is divided into four segments A, B, C, and D. However, this is only an example, and is not intended to limit the present disclosure, and the segment may be adjusted according to the requirements of the detection environment. All numbers and lengths of the multi-range fence which can achieve function of "gates" by setting a plurality of different sections and setting different threshold fall within the scope of the present disclosure.

In practice, the detected area is composed of a series of adjacent multi-range fence. Only when detection is required, the corresponding multi-range fence will be enabled, and the remaining multi-range fence (i.e., "passing gates") will be disabled. As a result, regardless of how the person or object crosses the "passing gate", the intrusion detecting device 300 view the situation as no object intrusion happens. Thus, the disabled segments are equivalent to "passing gates" which can freely enter and exit. That is, after the FMCW is converted into a spectrum by fast Fourier transform, the processor 310 can selectively set enable and disable of each segments.

Figure 6:
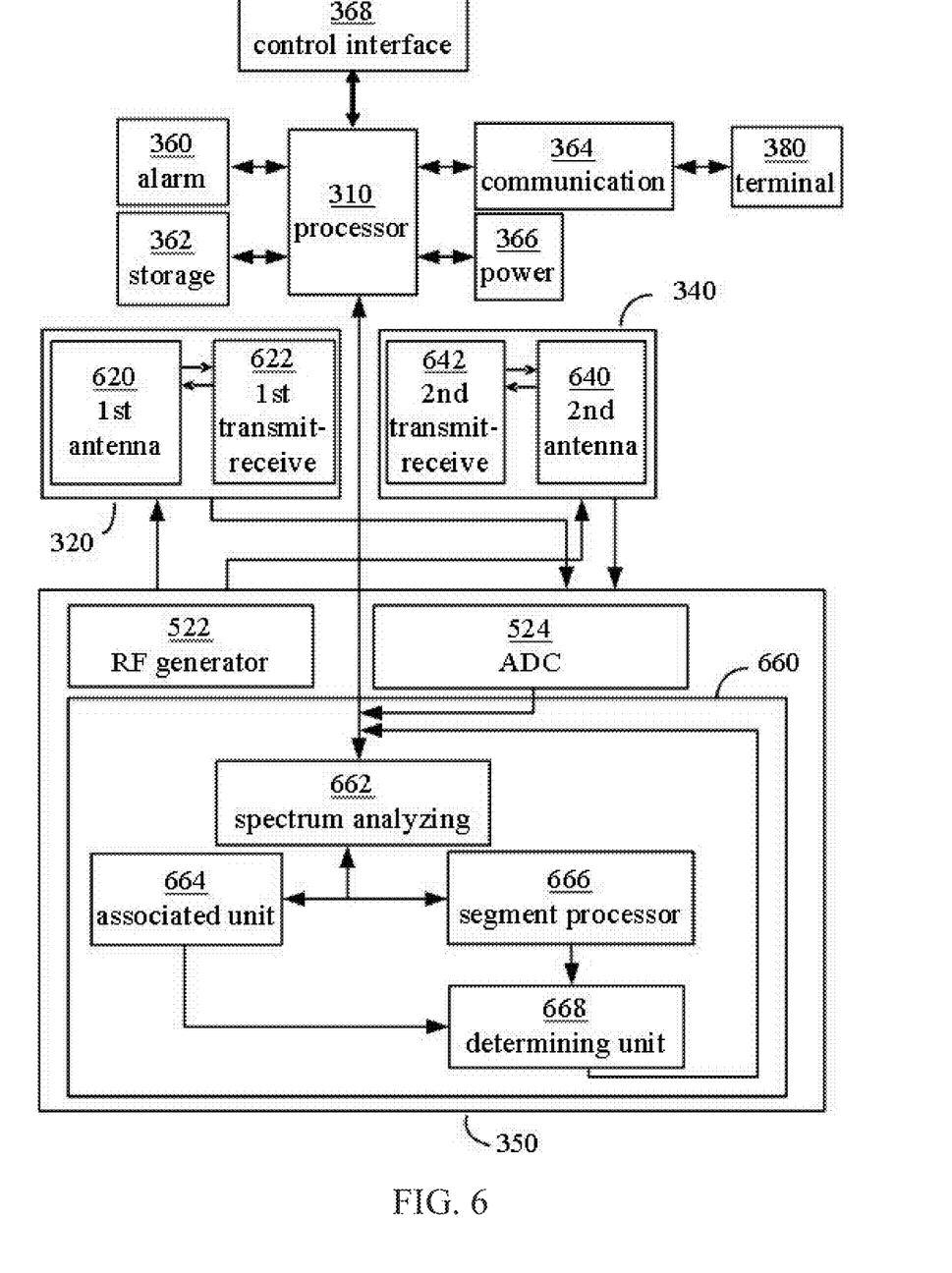
FIG. 6 illustrates a detailed block diagram of the first embodiment of the present disclosure.
Figure 7:
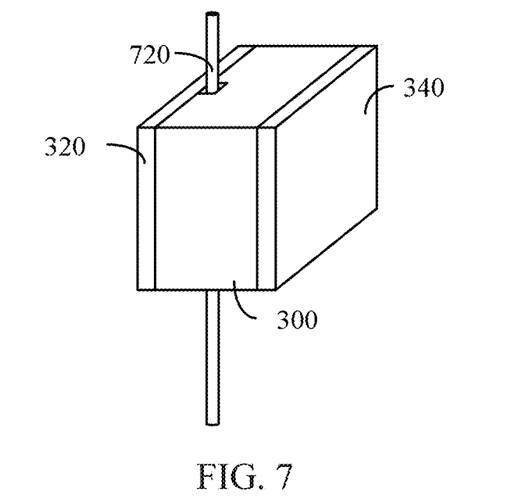
FIG. 7 illustrates an outward appearance of the first embodiment of the present disclosure.

In addition, in the first embodiment, the parameters, such as the scanning duration, position of "passing gates", the width of the passing gates, the threshold, and the determined condition, of the respective segments can be set by the control interface 368 as shown in FIG. 3 or FIG. 6. The control interface 368 can also include a display to display the current setting, the value before and after adjusting, or the operating state of the device. The parameters adjusted by the control interface 368 are also transmitted to the signal unit 350 through the processor 310 to generate the corresponding FMCWs.

After the intrusion detecting device of the present disclosure is activated, if the signal unit 350 and the processor 310 detect and confirm the intrusion of person, the vehicle, or the object in detection area, the warning message is transmitted to the alarm unit 360 or the communication unit 364. If the alarm unit 360 receives the warning instruction, the warning message, warning subtitle, warning vibration and segment position will be generated according to the predetermined settings. The processor 310 can also transmit the warning message to the terminal device 380 through the communication unit 364. The terminal device 380 can be any device capable of receiving messages, such as a central control center, a patrol handheld device or a video monitor. Therefore, the intrusion detecting device 300 of the present disclosure can adjust the parameters of each electronic fence, and can also notify condition monitored by the intrusion detecting device 300 to the relevant organization or person. Furthermore, the detecting device further includes a storage unit 362 can record any information transmitted and received by the intrusion detecting device 300, such as the detection result transmitted by the signal unit 350 to the processor 310, the warning message transmitted by the processor 310 to the alarm unit 360, and the parameters adjusted by the control interface 368, and information transmitted by the communication unit 364 to the terminal device 380.

Further, the processor 310 performs fast Fourier transform after receiving the data output by the ADC 54, and converts it into distance coordinate data, and then determines whether there is an intrusion of person or object or not according to the preset multi-range fences. As shown in FIG. 6, the spectrum analyzing unit 662 of a digital signal processor 660 performs pre-processing, filtering, and fast Fourier transform the difference frequency between the first transmit-receive unit 622 and the second transmit-receive unit 642. The result is sent to the segment processor 666 and an associated unit 664. The processor calculates according to individual detection conditions of each multi-range fence set by the control interface unit. The detection condition includes at least the trigger threshold of each multi-range fence. Then the result is sent to a determining unit 668. The associating unit 664 performs association calculation according to historical association conditions set by the control interface 368 and sends the result to the determining unit 668. The association condition includes at least the length of the historical data. The determining unit 668 uses the determining conditions decided by the control interface unit or the intrusion detecting device 300 to determine the data from the segment processor 666 and the association unit 664 are true or false (yes or no). The result is sent to the processor 310, the processor 310 then transfer the warning message to alarm unit 360 or communication unit 364. The determining conditions may include a maximum-maximum criterion (i.e. max-max most optimistic value, choosing the most profitable scheme), a minimum-minimum criterion (i.e. min-min, choosing the minimum loss scheme) or a minimum-maximum criterion (i.e. min-max most pessimistic value, choosing the most profitable scheme).

The detecting method of the first embodiment can be briefly described as follows. Detecting a first segment and a second segment by a first detecting unit to generate a first detecting result which includes steps: Transmitting first microwaves and receiving the reflected signal of the first microwaves, and calculating the first detecting result according to energy and distance of the reflected first microwaves. Detecting a third segment and a fourth segment by a second detecting unit to generate a second detecting result which includes steps: transmitting second microwaves, receiving the reflected second microwaves, and calculating energy and distance of the reflected second microwaves. If the reflected distance of the first detecting result belongs to the first segment and the energy of the first detecting result is greater than the first threshold, a warning message is generated by an alarm unit. If the reflected distance of the first detecting result is belongs to the second segment and the energy of the first detecting result is greater than a second threshold, a warning message is generated by the alarm unit. If the reflected distance of the second detecting result belongs to the third segment and the energy of the second detecting result is greater than a third threshold, a warning message is generated by the alarm unit. If the reflected distance of the second detecting result belongs to the fourth segment, and the energy of the second detecting result is greater than the fourth threshold, a warning message is generated by the alarm unit. The warning messages may include the location of the corresponding segments.

Figure 11:
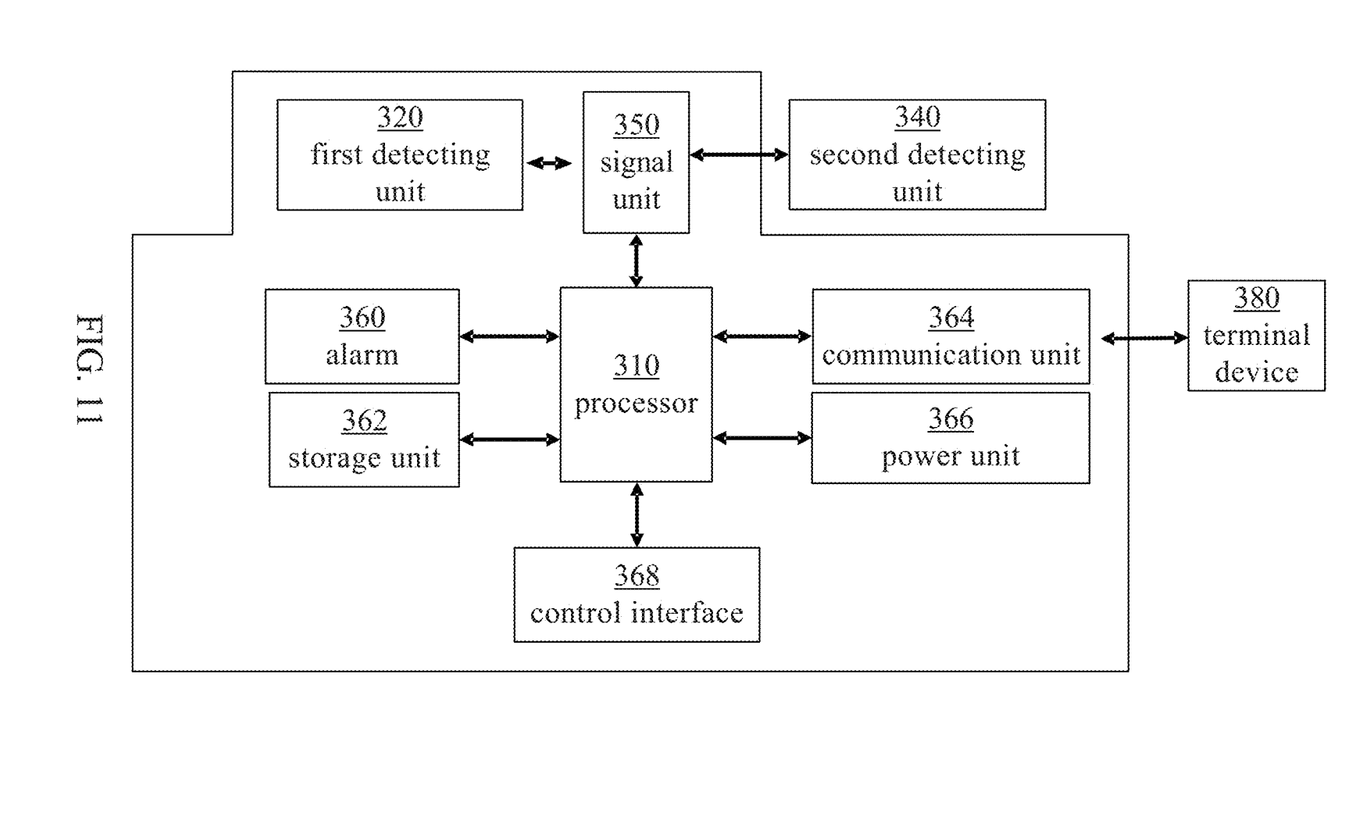
FIG. 11 illustrates a block diagram of a second embodiment of the present disclosure.

FIG. 11 shows a block diagram of the second embodiment of the present disclosure. The Intrusion detecting device 300 also includes a processor 310, a first detecting unit 320, a second detecting unit 340, a signal unit 350, a processor 310, an alarm unit 360, a storage unit 362, a communication unit 364, a power supply unit 366, a control interface 368, and a terminal device 380. the detailed structure of the second embodiment is similar to the first example. The second embodiment is characterized in that the physical structure of the second detecting unit 340 can be separated from the main body 301 of the device. Please take the first embodiment shown in FIG. 6 as reference for the connection and other detailed structures.

Figure 12:
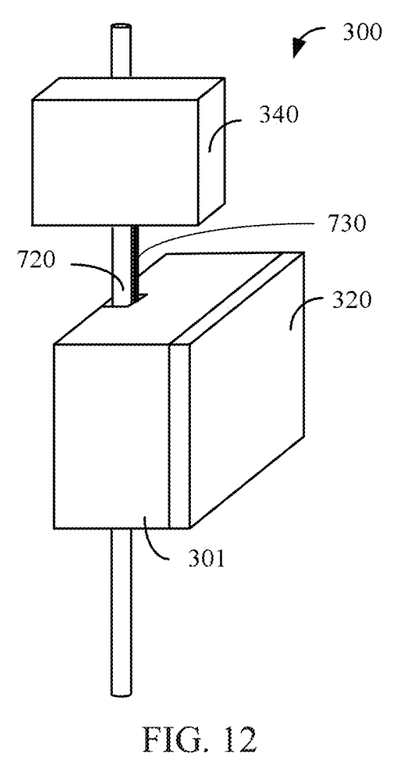
FIG. 12 illustrates an outward appearance of the second embodiment of the present disclosure.

FIG. 12 shows the outward appearance of the second embodiment which includes the intrusion detecting device 300, the second detecting unit 340 (consisting of a second antenna 640 and a second transmit-receive unit 642), and a mounting rod 720. The second detecting unit 340 may be separable. The second transmitting-receive unit 642 of the second detecting unit 340 is connected to the main body 301 through a RF cable 730. The second embodiment is characterized in that the second detecting unit 340 can be easily connected to and separated from the main body. If there are curve or obstacles in detecting area, the second detecting unit 340 can be separated from the device body 301. The angle of the second detecting unit 340 is adjustable according to the requirements of detection. The second detecting unit and the main body are installed on the same mounting rod 720.

Figure 13:
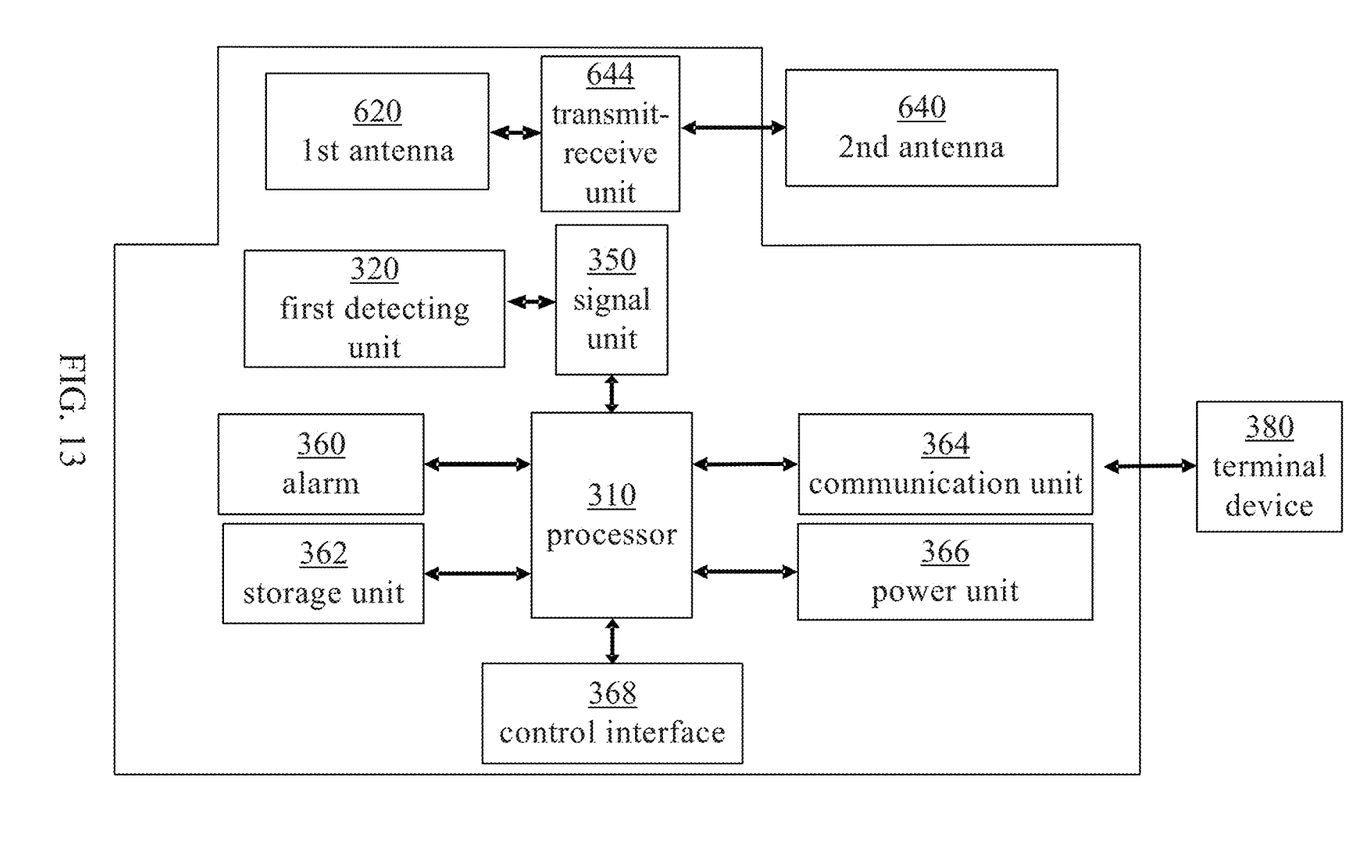
FIG. 13 illustrates a block diagram of a third embodiment of the present disclosure.

FIG. 3 illustrates a block diagram of the third embodiment of the present disclosure which is suitable for shorter detecting distance, for example, 40 meters for both sides. In the third embodiment, the man body 301 of the intrusion detecting device includes a processor 310, a first antenna unit 620, a transmit-receive unit 644, a signal unit 350, a processor 310, an alarm unit 360, a storage unit 362, a communication unit 364, a power supply unit 366, a control interface 368, and a terminal device 380. The third embodiment includes only one transmit-receive unit 644. The signals generated by the signal unit 350 are transmitted to the first antenna unit 620 and the second antenna unit 640 through the transmit-receive unit 644, and the echo signals reflected from the first antenna unit 620 and the second antenna unit 640 are received by the transmit-receive unit 644. The third embodiment further simplifies the hardware by integrating the two transmit-receive units of the first and second embodiments. The physical structure of the second antenna unit 640 can be separated from the main body 301. The second antenna unit 640 is connected to the transmit-receive unit 644 through a RF cable 730. Please refer to the first embodiment shown in FIG. 6 for the connection and other detailed structures.

Figure 14:
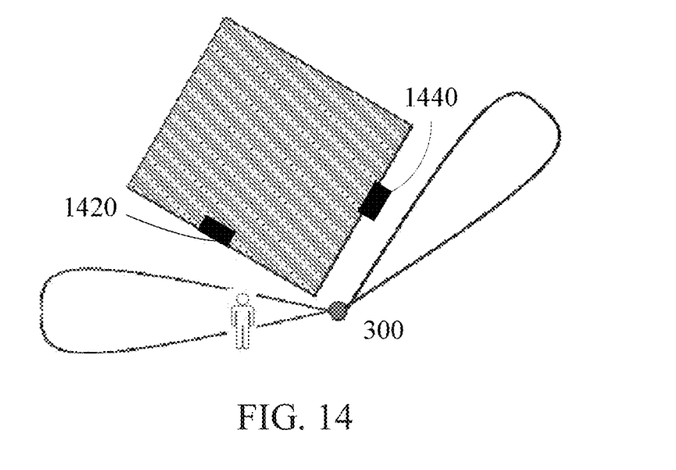
FIG. 14 illustrates detecting environment of the microwave intrusion detecting device with multi-direction and multi-range fence of the present disclosure.
Figure 15:
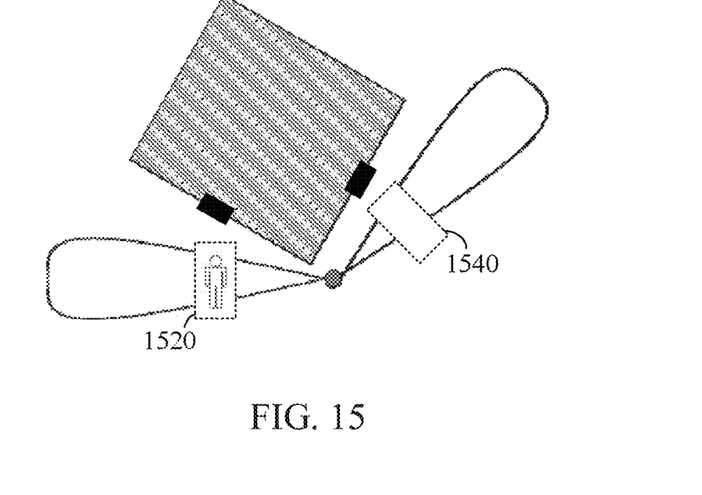
FIG. 15 illustrates passing gates of the microwave intrusion detecting device with multi-direction and multi-range fence of the present disclosure.

The intrusion detecting device 300 of the second embodiment and the third embodiment can also use preset parameters or parameters adjusted by control interface 368, so that each segments in the detection area has different trigger thresholds and result in the effect of providing a passing gate on the electronic fence is achieved. As shown in FIG. 14 and FIG. 15, by adjusting the angle of the detecting unit, the detection area composed by two antenna units is about 135 degrees, so that a single intrusion detecting device 300 can be used in the environment around surrounding by two walls and an electronic fence is formed on the periphery of the two walls. Two access ports 1420 and 1440 are original on the wall and an alarm unit is triggered when a person enters and exits. As shown in FIG. 15, gates 1520 and 1540 are set in the detection area thus the alarm unit will not be triggered even a person enters and exits through the gates 1520 and 1540.

Figure 16:
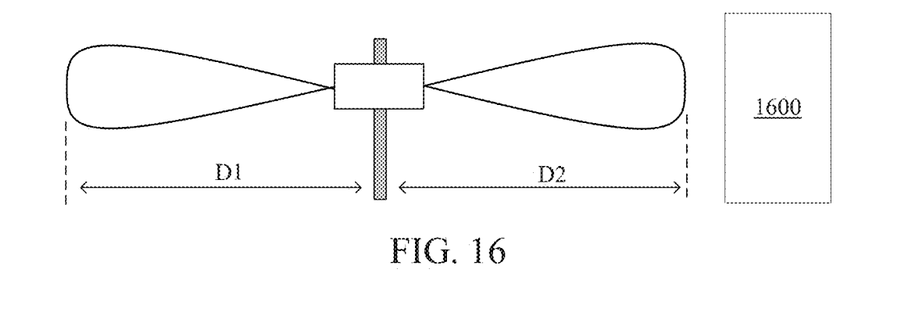
FIG. 16 illustrates detecting distances of the microwave intrusion detecting device with multi-direction and multi-range fence of the present disclosure.

The multi-directional and multi-range fence intrusion detecting device of the present invention not only can adjust the direction of the antenna to cover desired detecting area, but also can adjust trigger threshold to set the passing gates. In addition, detecting distance of the detecting device can be adjusted as well to adapt to different detection environments. As shown in FIG. 16, in the first and second embodiments, the original unilateral detection distance of the first detecting unit 320 and the second detecting unit 340 is 150 meters, thus the total detection distance of the intrusion detecting device 300 is 300 meters. However, there is an unavoidable strong reflective obstacle 1600 in the environment, which shortens the required detection distance to 120 meters. The reflection of the obstacle will cause a strong change in the automatic gain characteristics of the device, resulting in a decreased performance or unstability of the detecting unit. Therefore, the multi-directional and multi-range electronic fence of the present disclosure can adjust the software parameters so that the detection distances D1 and D2 of the two sides are both 60 meters, thus the total detection distance of the intrusion detection device becomes 120 meters. One of the adjustable software parameters is scan period T of the FMCWs. According to formula (2)

$$R = \frac{f_b cT}{2B},$$

lowering the scan period T will reduce the detecting distance base on the same condition and same parameters. Additionally, if the position available for installing is limited and the installing position cannot be at a midpoint of 120 meters detecting distance. The detecting distances can be adjust as forward detecting distance D1 is 40 meters and the backward detecting distance D2 is 80 meters. That is, the detecting distance D1 of the first detecting unit 320 is 40 meters, and the detecting distance D2 of the second detecting unit 340 is 80 meters. By changing the software parameters, the front and rear detection units use different scanning periods T1 and T2 accordingly to achieve forward detecting distance is 40 meters and the backward detecting distance is 80 meters. The detecting distance being 40 meters is only an example, instead of a limitation, of the values D1 and D2.

Figure 17:
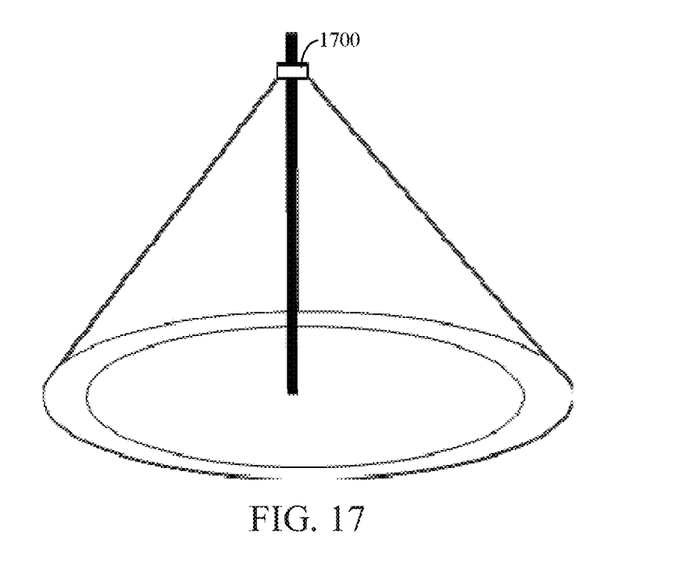
FIG. 17 illustrates installation of the microwave intrusion detecting device with multi-direction and multi-range fence of a fourth embodiment of the present disclosure.
Figure 18:
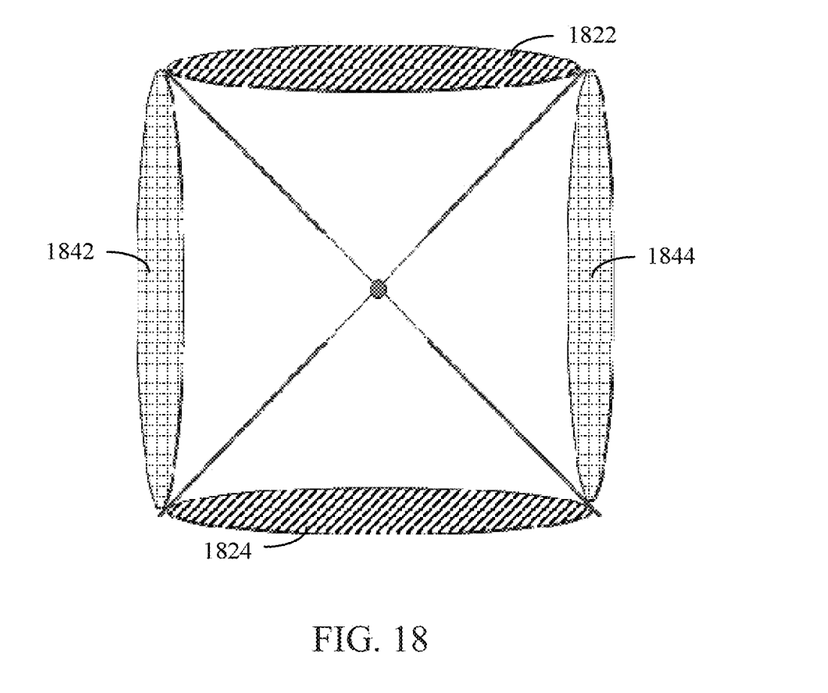
FIG. 18 illustrates a top view of an antenna radiation pattern of the microwave intrusion detecting device with multi-direction and multi-range fence of a fourth embodiment of the present disclosure.

The present disclosure further includes a fourth embodiment as shown in FIG. 17. In FIG. 17, two set of intrusion detecting device (i.e. four detecting unit) are installed on the same mounting point 1700 so that the detecting area similar to a circular shape. For example, two intrusion detecting devices 300 are respectively installed at the left and right or the upper and lower positions on the same position. Each device uses antennas covering a wide angle, for example, 90 degrees horizontally and 9 degrees vertically. Thus, the antennas of the two devices can cover about 360 degrees, and the detection area is shown as FIG. 18, wherein the detection fields 1822 and 1824 are the detection areas formed by the same intrusion detection device, and the detection fields 1842 and 1844 are the detection areas formed by another intrusion detection device. The fourth embodiment can be applied on higher position, and an electronic fence covering a large angle on the ground which provides with a good effect on alerting a specific area.

Furthermore, the multi-direction and multi-fence intrusion detecting device of the present disclosure can be integrated with an image device or a monitor. In detail, the multi-direction and multi-range fence intrusion detecting device of the present disclosure uses a microwave signal which is harder to be affected by weather and small objects (such as flowers and plants) in comparison with detecting method utilizing image recognition. In the meanwhile, microwaves also have farther detection distances while image recognition has better recognition ability. The intrusion detecting device of the present disclosure can divide the detecting area into segments and each segment can be set in different trigger threshold. Thus photography device which is telescopic or focal-length adjustable can be applied on the present disclosure. After the distance of the intrusion is detected, the processor 310 can transmit the distance message to the photography device for adjust the focus, monitor and recognizing sensitivity. Also, the recognition result of the photography device can be transmitted back to the processor for comparing with data base to exclude or enhance the warning. For example, images of people or targets which are allowed to pass are stored in advance to ignore a person or object that does not need to be alerted. Hence, the probability of false alarm is reduced or a person or target required higher intensive manages can be reported immediately. Thus, warning functions of the electronic fence of the present disclosure are enhanced.

The present disclosure has been disclosed in its preferred embodiments which are not intended to limit the invention. Any amendment and modification without departing from the concept and scope of the present disclosure fall within the protected scope definition by the claims of the present disclosure.

What is claimed is:

1. A microwave intrusion detecting device with a multi-direction and multi-range fence, comprising:
   a first detecting unit utilized to detect a first area and generate a first detecting result, wherein the first area comprises a first segment and a second segment, the first detecting unit comprises:
   a first emitting end utilized to emitting first microwaves; and
   a first receiving end utilized to receive reflected first microwaves;
   wherein the first detecting unit obtains the first detecting result according to the reflected first microwaves, the first detecting result comprises energy of the reflected first microwaves and a reflected distance of the reflected first microwaves;
   a second detecting unit utilized to detect a second area and generate a second detecting result, wherein the second area comprises a third segment and a fourth segment, and the second detecting unit comprises:
   a second emitting end utilized to emit second microwaves; and
   a second receiving end utilized to receive reflected second microwaves;
   wherein the second detecting unit generates the second detecting result according to the reflected second microwaves, the second detecting result comprises an energy of the reflected second microwaves and a reflected distance of the reflected second microwaves;
   a processor utilized to receive the first detecting result and the second detecting result and set a first threshold, a second threshold, a third threshold, and a fourth threshold corresponding to the first segment, the second segment, the third segment, and the fourth segment, respectively; and
   an alarm unit utilized to generate a warning message if the reflected distance of the reflected first microwaves falls in the first segment and the energy of the reflected first microwaves exceeds the first threshold, or if the reflected distance of the reflected first microwaves falls in the second segment and the energy of the reflected first microwaves exceed the second threshold, or if the reflected distance of the reflected second microwaves falls in the third segment and the energy of the reflected second microwaves exceed the third threshold, or if the reflected distance of the reflected second microwaves falls in the fourth segment and the energy of the reflected second microwaves exceed the fourth threshold;
   wherein the warning message comprises a location of the first segment, the second segment, the third segment, or the fourth segment.

2. The microwave intrusion detecting device according to claim 1 further comprising a control interface connected to the processor, wherein the first threshold, the second threshold, the third threshold, or the fourth threshold are adjustable through the control interface.

3. The microwave intrusion detecting device according to claim 1, wherein the first area and the second area are divided into more than two segments, each of the segments be set a corresponding trigger threshold.

4. The microwave intrusion detecting device according to claim 1 further comprising a communication unit connected to the processor and utilized to transmit the first detecting result, the second detecting result or the warning information to a terminal device.

5. The microwave intrusion detecting device according to claim 1 further comprising a power supply unit utilized to supply power to the microwave intrusion detecting device, wherein the power supply unit is a battery or a transformer configured to transform alternating current power into direct current power.

6. The microwave intrusion detecting device according to claim 1, wherein the second detecting unit is separated from a main body of the microwave intrusion detecting device for adjusting a direction of the second detecting unit.

7. The microwave intrusion detecting device according to claim 1, wherein the second detecting unit comprises an antenna separated from a main body of the microwave intrusion detecting device for adjusting a direction of the antenna.

8. The microwave intrusion detecting device according to claim 4, wherein the terminal device is a monitor.

9. A microwave intrusion detecting method with a multi-direction and multi-range fence, comprising:
   generating a first detecting result by detecting a first segment and a second segment through a first detecting unit, comprising:
   emitting first microwaves and receiving reflected first microwaves; and
   calculating an energy of the reflected first microwaves and a reflected distance of the reflected first microwaves to obtain the first detecting result;
   generating a second detecting result by detecting a third segment and a fourth segment through a second detecting unit, comprising:
   emitting second microwaves and receiving reflected second microwaves; and
   calculating an energy of the reflected second microwaves and a reflected distance of the reflected second microwaves to obtain the second detecting result;

deciding whether to send a warning message or not through a processor, comprising:

generating the warning message by an alarm unit if the reflected distance of the reflected first microwaves falls in the first segment and the energy of the reflected first microwaves exceeds a first threshold;

generating the warning message by the alarm unit if the reflected distance of the reflected first microwaves falls in the second segment and the energy of the reflected first microwaves exceeds a second threshold;

generating the warning message by the alarm unit if the reflected distance of the reflected second microwaves falls in the third segment and the energy of the reflected second microwaves exceeds a third threshold;

generating the warning message by the alarm unit if the reflected distance of the reflected second microwaves falls in the fourth segment and the energy of the reflected second microwaves exceeds a fourth threshold.

10. The microwave intrusion detecting method according to claim 9 further comprising a control interface utilized to adjust the first threshold, the second threshold, the third threshold, or the fourth threshold.

* * * * *